July 6, 1965

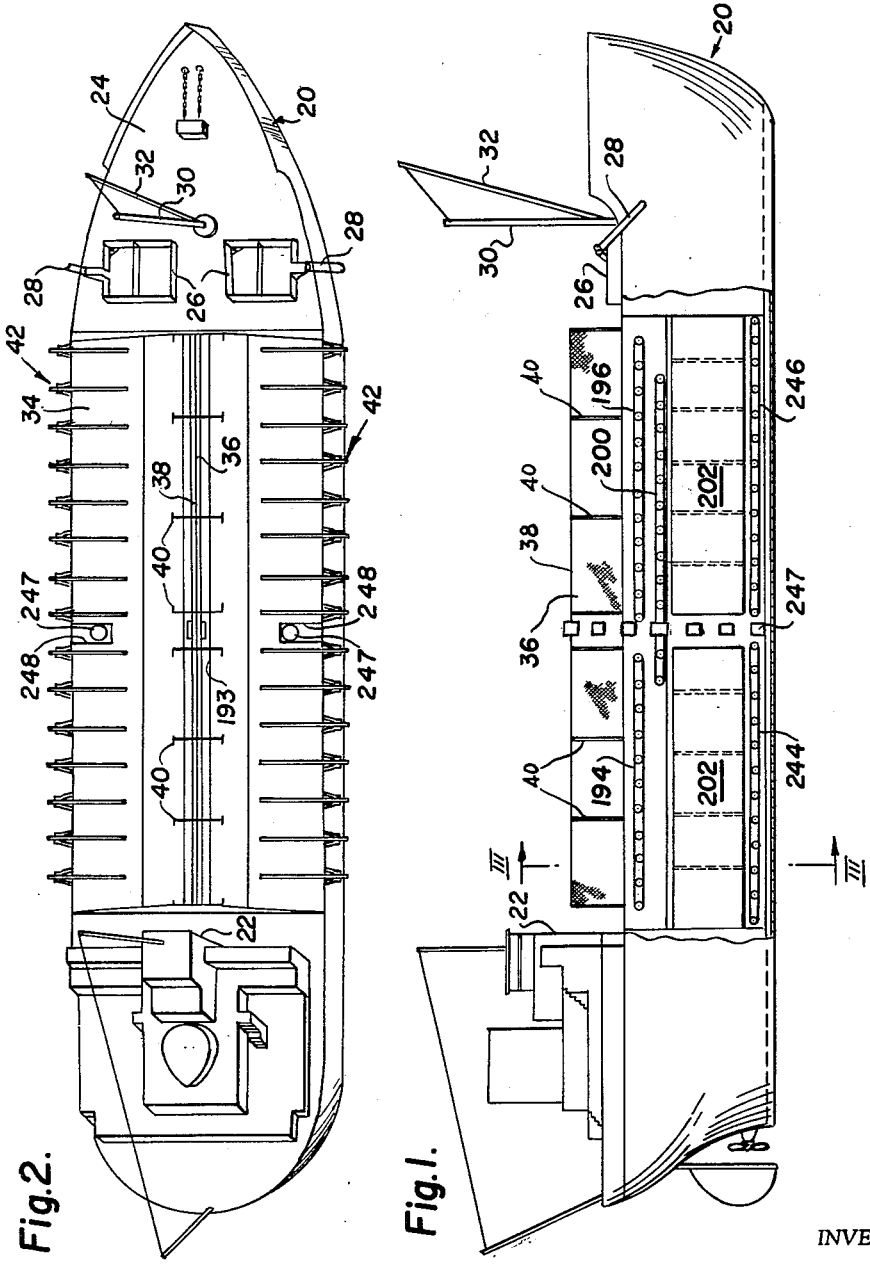

H. C. RICE 3,192,659

AUTOMATIC FISHING AND FISH HANDLING
APPARATUS FOR FISHING VESSELS

Filed Dec. 12, 1961

INVENTOR.
HARRY C. RICE
BY
Murray and Young
his ATTORNEYS.

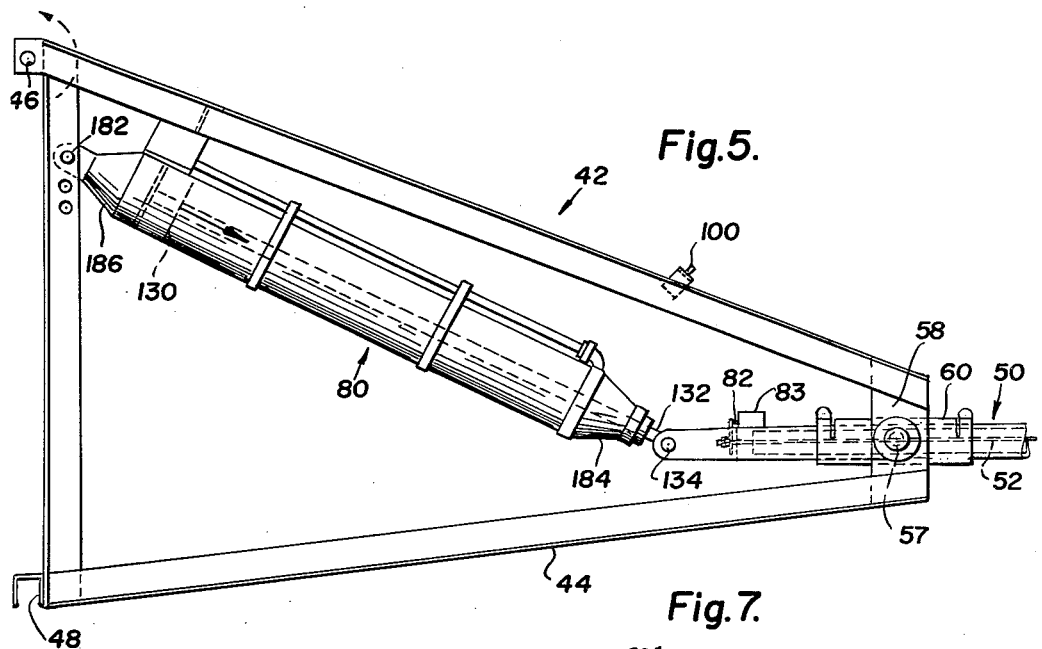
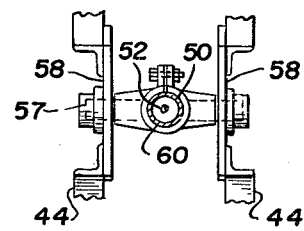
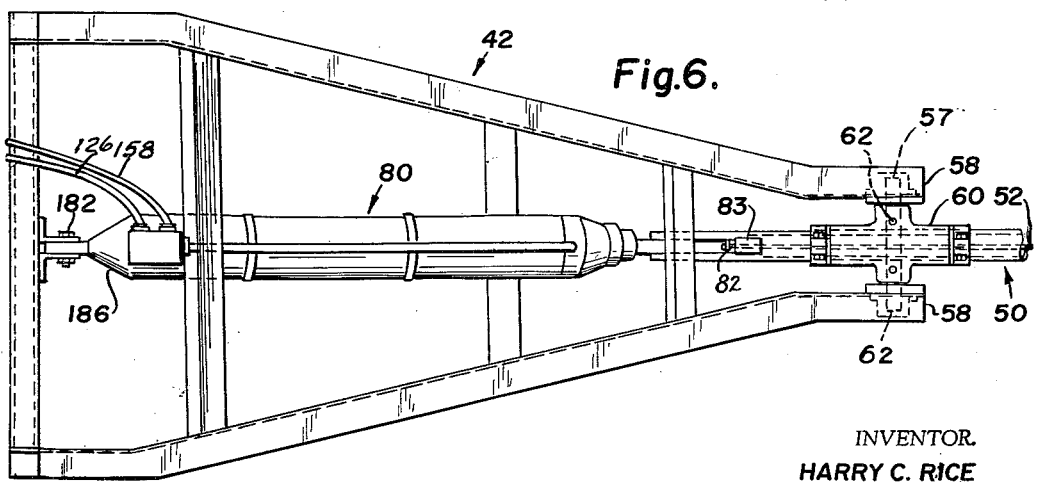
INVENTOR.
HARRY C. RICE
BY
his ATTORNEYS.

July 6, 1965
H. C. RICE
3,192,659
AUTOMATIC FISHING AND FISH HANDLING
APPARATUS FOR FISHING VESSELS
Filed Dec. 12, 1961
5 Sheets-Sheet 4
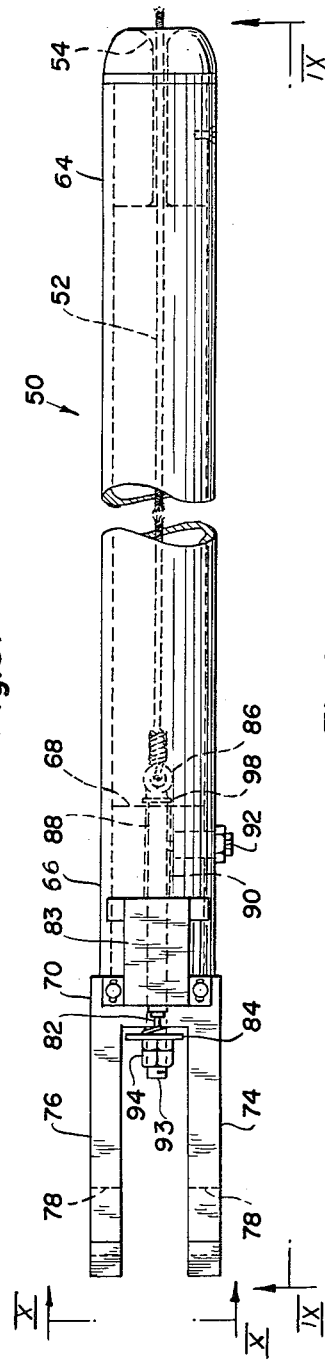
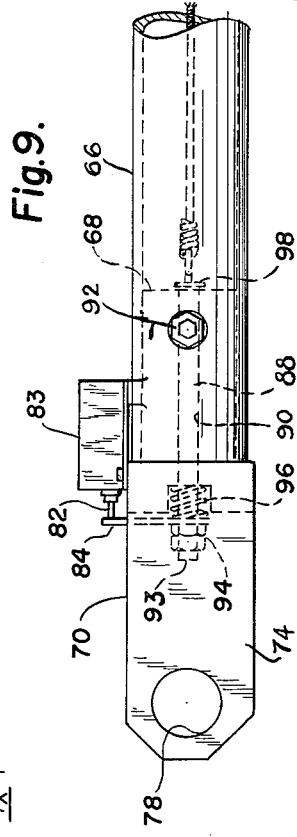
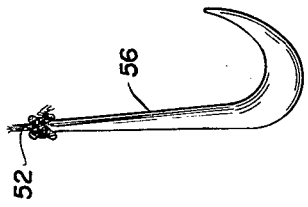
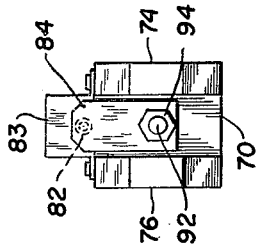
INVENTOR.
HARRY C. RICE
BY
Murray and Young
his ATTORNEYS.

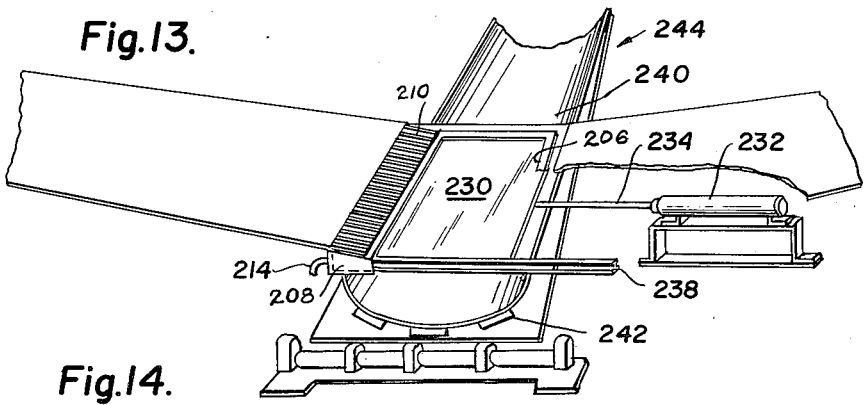
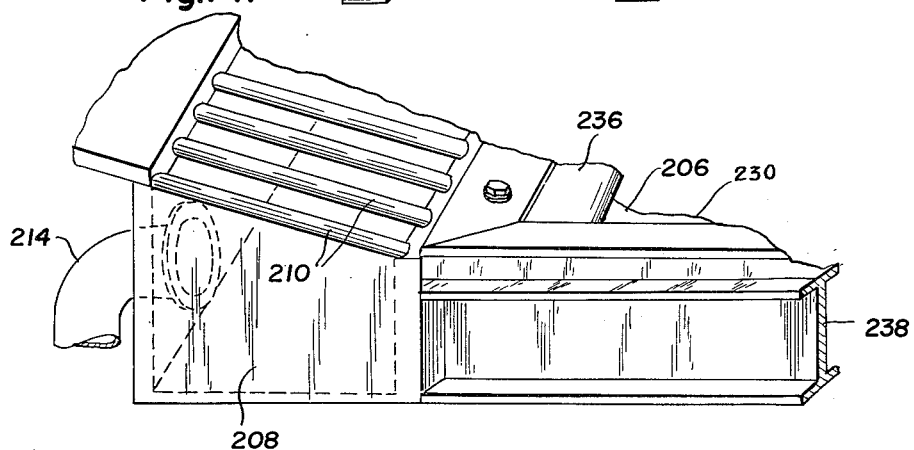
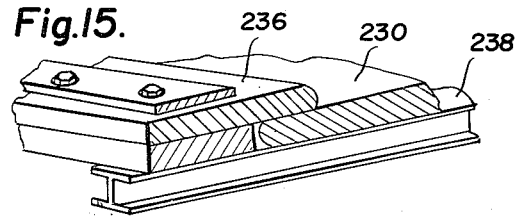

United States Patent Office 3,192,659
Patented July 6, 1965

3,192,659
AUTOMATIC FISHING AND FISH HANDLING
APPARATUS FOR FISHING VESSELS
Harry C. Rice, 1811 N. Brookfield, South Bend, Ind.
Filed Dec. 12, 1961, Ser. No. 158,857
3 Claims. (Cl. 43—15)

This invention relates to apparatus for automatically catching fish and thereafter handling the fish including their storage and unloading once they are on board the fishing vessel. All of these steps are accomplished by mechanisms which require only moderate attention and regulation and therefore the fishing operation becomes almost entirely automatic which means that the fishing rate can be increased and the fishing crew can be reduced in size to effect greater economy of operation.

In practice, a considerable period of the fishing operation is devoted to seeking out fish schools. These fish schools are transitory so that while the vessel is in position to make a catch, fishing must proceed as rapidly as possible since contact can be lost with the school before the ship is loaded to capacity. The best possible manual fishing effort of the most experienced fishermen is inadequate to obtain a proper catch during the time contact is made with a fish school. This is especially the case in tuna fishing where tuna range to a considerable size and human endurance is insufficient because of strenuous effort involved in landing fish, e.g., most experienced fishermen are capable of hauling tuna on board for no more than about forty-five minute periods before reaching a fatigue limit.

It is an object of the present invention to increase the efficiency of fishing operation by providing a plurality of separately operable fishing elements each of which is capable of automatic fishing operation so as to eliminate manual fishing. In this manner, I can both speed up and carry on for longer periods of time a fishing operation and efforts can be concentrated more on maintaining contact with the school of fish or in processing or handling the fish once they are on board. Consequently, the capacity to catch fish is not limited by human endurance and therefore greater catch hauls can be made from a given school contact than is the case with a crew even of the most experienced fishermen.

It is a further object of the invention to provide a novel series of fish handling mechanisms which are so combined that when fish are hauled on board they are automatically directed to a prescribed area, and are then transported into the hold of the ship where they are charged into compartments which are filled in a certain order and amount so that the ship is at all times in even balance. A related object is that handling and storing of the fish will occur with minimum damage to the fish which are not crushed or damaged but remain substantially intact.

A further object of the invention is to provide a fishing vessel which also includes novel means for treating the fish while they are in the load compartment whereby the fish can be cleaned by fresh sea water wash or, in some instances, the fish can even be frozen so that they will last indefinitely on board should there be necessity for keeping the fish on board for any considerable length of time because of difficulties in docking.

A yet further object of the invention is to provide a novel means for unloading the fish so that the fish are controllably discharged from their compartments within the hold of the ship by withdrawal from a preselected hold and in a preselected amount so that the ship retains its balance during unloading.

An overall object of the invention is that these functions of automatically catching, handling, storing and discharging take place with minimum crew size, the main function of the crew now being devoted to maintenance of the equipment rather than the fishing operation proper. It will be seen from an analysis of my invention that it is possible to obtain literally tons of fish caught within a very short period so that the ship can be filled to capacity with a single fish school contact with the result being that greater efficiency is made from these contacts and the period of time the fishing vessel is at sea is considerably reduced. All of these factors contribute substantially to a more economical fishing operation both because of the smaller crew which is required, and because of the shorter "at sea" periods of the ship for obtaining a full catch.

The invention is not, of course, limited to a particular kind of catch, nor to such other indefinite factors as ship size, number of fishing units, etc., these being matters of design requirement.

Other objects and features of the invention will become apparent from a consideration of the following description, which proceeds with reference to the accompanying drawings, wherein:

FIGURE 1 is a side elevation view of the fishing vessel with the hull broken away to illustrate the interior compartments;

FIG. 2 is a top view of the fishing vessel looking downwardly on the deck of the vessel of FIG. 1;

FIG. 5 is an enlarged detail view of the fish-catching apparatus which is suspended over the side of the ship;

FIG. 6 is a top view of the apparatus shown in FIG. 5 viewed from the upper portion of FIG. 5;

FIG. 7 is an enlarged detail view of the pivot support provided for the pole;

FIG. 8 is an enlarged detail view showing the end of the pole which is associated with the actuator mechanisms;

FIGS. 9 and 10 are additional views of the actuator end of the fishing pole looking in the direction of the arrows IX—IX and X—X of FIG. 8;

FIG. 11 is a detail view of the jig barbless hook end of the fishing pole line which is extended over the side of the ship, that is the end of the pole opposite the end shown in FIG. 8;

FIGS. 13, 14 and 15 are fragmentary detail views of the sump and lower hold fish-discharging structure which is operated when the ship is being unloaded.

Figure 3:
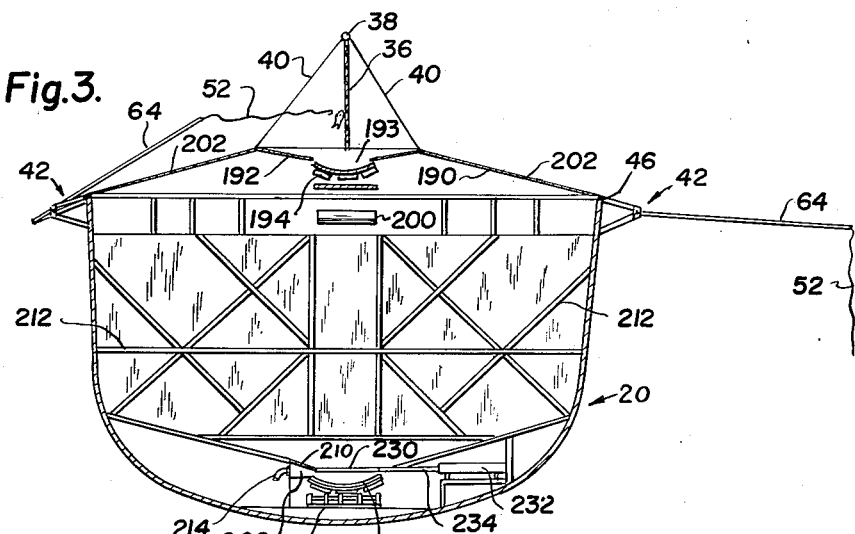
FIG. 3 is an enlarged section view taken on the line III—III of FIG. 1.

Referring now to the drawings, the fishing vessel, designated generally by reference numeral 20 includes a pilot house 22 from which the entire fishing operation is controlled and in which a control panel is provided (not shown) to commence actuation of each of the automatic fishing devices or to deactuate any one of the devices, or all of them when the fishing operation is completed.

At the forecastle 24 of the ship are two chum tanks 26 charged with quantities of bait fish which are fed overboard automatically by a mechanism, fully described in my copending application Serial No. 158,354, filed December 12, 1961, entitled "Fishing Tank," and which is incorporated herein by reference. Details can be obtained concerning the construction and operation of the chumming tank by reference to this copending application.

The purpose of the chumming tank is to feed fish overboard through a chute or the like 28 in order to attract the attention of a school of tuna or other quarry fish and to hold the attention of the fish school during which time automatic fishing takes place. The chumming tanks are filled with the help of a derrick 30 and boom 32. Extending along the length of the deck 34 between the forecastle and pilot house, and substantially midway between the port and starboard sides of the vessel, is a slack rope net 36 which is suspended from a ridge pole 38 having spaced support A-frames 40, the purpose of the net 36 being to break the momentum of the fish as they are flung on board by operation of the automatic fishing apparatus designated generally by reference numeral 42 which will be next described.

*Automatic fishing apparatus*

The apparatus 42 includes a support bracket 44 which is supported through a hinge connection 46 with the side of the ship and includes a push connection 48 which rests against the outer surface of the ship side when the fishing apparatus is in fishing position. The bracket 44 can be rotated counterclockwise from the position shown in FIG. 5 (and FIG. 3) so that it rests on deck when the fishing apparatus is not in use and does not extend overboard, to reduce likelihood of damage when the ship is docking. The fishing apparatus 42 includes a long pole 50 of lightweight but rigid material such as fiber glass or aluminum tubing or the like and which preferably has some elasticity thereto to provide a slight flex action which assists in bringing fish out of the water and hurling them along a preferred back stroke trajectory so that the fish will land in the vicinity of the net 36. Thus the immediate removal of the caught fish from the water prevents shark damage.

The pole 50 includes a fishing line 52 which is of nylon or other high tensile strength material as is highly resistive to rotting. The line has a tensile strength which will permit landing fish weighing up to 750 pounds plus or so. The line 52 is threaded through a smooth radiused opening 54 at the end of the pole 50 so that the line will not be cut when it moves slightly longitudinally through the opening 54.

At the end of the line is a smooth unbarbed hook 56 which is unbarbed because when it catches in the fish's mouth it will readily unhook during fish landing. As the fish is flung on board and the line 52 relaxes, the hook 56 becomes detached from the fish's mouth by the natural trajectory movement of the fish and line. Therefore, connection of the hook 56 with the fish lasts only during landing when initial tension is imposed on the line 52 to land the fish by its being jerked upwardly along a landing trajectory, and then the hook is shaken loose from the fish's mouth. The pole 50 has its major dimension on one side of the fulcrum 57 provided at the end 58 of a bracket 44. Two trunnion sections 60 are clamped over the end of the pole and are journaled on pins 62 which are supported for turning movement in end 58 so that the pole end 64 (FIG. 3) can be swung both in outboard and inboard directions—outboard for fishing and inboard for landing the fish.

The pole end portion 66 is telescoped over a sleeve 68 which is an integral part of clevis 70, each of the arms 74, 76 of which include openings 78 which are in alignment and which are operatively connected with a pneumatic actuator 80 to provide a jack knife connection by which the pole 50 is moved arcuately on its fulcrum mounting 57.

What controls the pneumatic actuator 80 is a switch 82 mounted within a switch box 83 which is movable adjustably to the right or to the left (FIG. 9) and is then bolted in place so that the switch 82 is just in contact with the switch arm 84 when the pole is in fishing position. The switch arm 84 operates the switch 82 by the tension of line 52 which is subjected to tension during a fish strike or while centrifugal force is produced on the line by the attached fish when the pole is swung in a fish landing direction.

The line 52 is secured to an eye 86 of eye bolt 88 which is reciprocally movable within passage 90 of sleeve 68. Movement of the eye bolt is made as free as possible while still providing adequate bearing support. A lubricating stud 92 insures frictionless movement of bolt 88 within passage 90. The end 93 of the bolt is threaded to receive nuts 94 which carry the switch arm 84 and spring 96 biases eye bolt 88 so that the switch arm 84 is normally in release position with respect to switch 82 such that the collar 98 is in contact with the end of the sleeve 68. The spring 96 is compressed during a fish strike while tension is developed in line 52 to permit the arm 84 to operate switch 82; but, as soon as the tension in line 52 is relieved the spring 96 will bias the switch arm 84 to a switch-releasing position thereby deactuating micro switch 82 which in turn deactuates the pneumatic air cylinder actuator 80.

Once the pole is swung completely to a fish landing position, it makes contact wtih a second switch 100 (FIG. 5) which reverses operation of the pneumatic air cylinder 80, moving the pole 50 from an inboard position to an outboard position so that the fishing operation is completed. The control mechanism is so arranged that the fishing pole will not be returned to its fishing position if the fish has not shaken loose from the line. This can best be explained with reference to FIGS. 5, 6 and 12 combined. When the switch 82 is first operated this closes contacts which enable an electrical circuit from a power source such as a battery 104 or other electrical source, through conductor 106, conductor 108, through normally closed switch 110, conductor 112 to winding 152 on solenoid 114, thereby moving the closed center spool valve 116 to the left and communicating port 118 with port 120 so that line 122 from pressure source 124 is communicated through line 126 with chamber 128 moving the piston 130 and piston rod 132 toward the right. As indicated in FIGS. 5 and 6, the piston rod 132 has an articulated connection 134 with openings 78 of the clevis 70 forming an articulate connection so that the fishing pole is rotated by extensile movement of the piston 130 from an outboard to an inboard position thereby landing the fish. When the pole has reached its maximum inboard position, it contacts switch 100 completing a circuit from the negative terminal of battery 142 through conductor 133, contacts 135 on switch 100, conductor 136, the time delay relay 138, and conductor 140 to the positive terminal of battery 142 to thereby open switch 110 and close switch 144. When the switch 144 closes, a circuit is completed through battery 104 conductor 146, contacts 148 of switch 144, winding 150 on solenoid 114, and conductor 149 to actuate the spool valve 116 toward the right.

Note that windings 150 and 152 are wound oppositely so that when switch 144 is closed, winding 150 is energized; and, when switch 82 is closed with switch 110 closed oppositely wound winding 152 is energized so that the same solenoid 114 is effective in moving the spool 116 toward the right or to the left.

When the spool 116 is moved toward the right the pressure source is connected through port 118, line 122 and line 153 to chamber 160 moving the piston 130 toward the left causing the piston rod 132 to move leftwardly thereby swinging the pole 50 outboard to a fishing position. Should there be a fish retained on the line 52, switch 82 will be closed but since the switch 110 is open only the winding 150 is energized from switch 144 being closed by switch 100. Thus, coils 150 and 152 of the solenoid 114 are not simultaneously energized to produce damage to the solenoid. Also, there is a preference given to moving the pole in outboard direction once the switch 100 is closed.

It is undesirable to make a recast if there is a fish on the line and for that reason, I have arranged the electrical system such that the pole will rock back and forth in an attempt to shake the fish loose before making a recast. For example, the time delay relay can be adjusted so that it will, when energized by switch 109, only momentarily hold the switch 144 in closed position and will then open switch 144, closing switch 110 and the tension on fishing line 52 closing switch 82, will cause the pole to rock back to an inboard position until the pole again contacts switch 100. This cycle of closing switch 100, closing switch 144 to start a recast and then a return to an inboard position by closing of switch 110 and switch 82, will cause the pole to continue to rock back and forth through a limited arcuate travel until the fish is shaken loose while it is over the deck.

In some operations, whether the fish is shaken loose or not, I find it advisable to adjust the time delay relay so that the pole will remain in an inboard position after having made a catch for a period of some duration so that the hook can be individually baited. However, in the case of tuna fishing no bait is required and therefore the time delay relay can be set to approximately one-tenth or other suitable fraction of a second with the use of a barbless hook.

The time delay in the relay is sufficient however so that switch 144 is closed for a long enough time to maintain spool valve 116 at a rightward position communicating pressure source 124 with chamber 160 so that enough force is imparted to the piston 130 rocking the pole 64 over center and to a fishing position in every instance. Thus, assuming that the fish has shaken loose from the line 52, as it does in almost all cases, there is no tension in the line 52 and thus switch 82 is open during recast and switch 144 is closed for a long enough time so that the solenoid 114 remains in a rightward position long enough to communicate force from pressure source 124 to chamber 160 insuring that the pole will receive a boost of compressed air providing sufficient impetus to move the pole from inboard to outboard position.

When the spool valve 116 is in neutral position, it is retained in that normal position by opposed springs 170, 172 and the chambers 128, 160 are communicated through lines 126, 153 with exhaust lines 174 and 176 communicating with line 178 leading to atmosphere. Thus, in a neutral position of the closed center spool valve 116, the piston 130 can be moved more freely. I have found it advisable however to cushion the piston movement as it reaches the limits of its movement on a fish catching or casting stroke, this being done in some suitable manner as by pushing against a dead air space having no outlet or at most a limited outlet.

When the pressure source 124 is communicated to chamber 128 by operation of switch 82 during a catching stroke the centrifugal force of the fish on the end of the line and the initial stroke of the fish will maintain tension on the line only during a part of the catching operation and when the pole is actuated by the surge of pressure from pressure source 124, it is usually the case that before the pole is at its full inboard position the tension on the line will have been relieved and switch 82 deactuated; but, the momentum of the pole movement should be cushioned both to prevent injury to the equipment and also to allow the fish to shake loose if it is still attached. For cushioning purposes I provide conical ends 184 and 186 to the cylinder into which pockets of air are forced by movement of the piston 130 (FIG. 5) in the directions of the arrows and therefore as the pole approaches its full inboard position it is cushioned and brought to a slow stop; likewise, when the piston movement is reversed and the pole is brought to a cast position by a surge of pressure from pressure source 124 to chamber 160. The piston 130 as it approaches its position shown in FIG. 5 is cushioned by trapping air within conical end 186 which cushions movement of the piston 130 as it approaches end 186. Thus, when the pole reaches its full cast position it is slowed rather than brought to an abrupt halt. The particular cylinder construction is not however an essential part of the present invention and other cylinders are equally usable for my invention. However, I have found that a specific cylinder construction which is usable for my purpose is one provided by Tomkins-Johnson Company of Jackson, Michigan, Style No. 3, 8 inch bore size. It is not my purpose, however, to be limited to a specific cylinder construction which is cushioned at both ends of its stroke, and indeed, it is not essential to the invention that any cushioning be provided at the extremities of stroke for the power cylinder.

Fish loading apparaus

Figure 4:
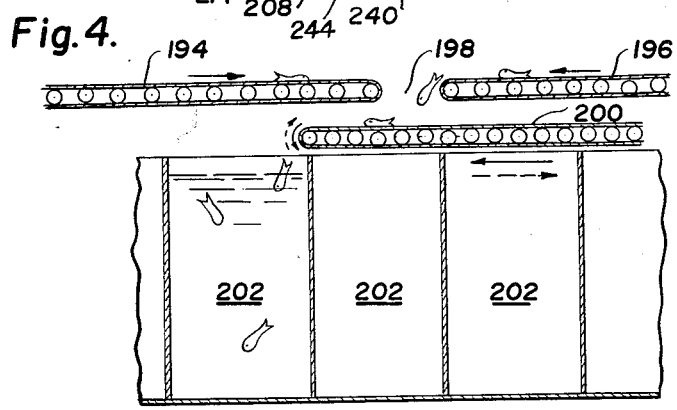
FIG. 4 is an enlarged diagrammatic view of the fish handling apparatus within the hold of the ship.

The fish catching operation goes on continuously so long as the vessel remains in the vicinity of the fish school and the fish catching apparatus is energized. As the fish are caught, they are swung against the slack net 36 and will then fall through the opening 193 without causing injury to the fish. The landed fish are transferred substantially continuously by operation of the two belts 194, 196 to the belt 200, which is operable for turning movements in one curved arrow direction or the other (FIG. 4) and the conveyor as a whole is movable in one direction or the other as indicated by the straight line arrows (FIG. 4). The operation of conveyor belt 200 is under the control of an operator who determines the position of the conveyor 200, its direction of turning movement, and duration of movement to control order of filling of the various hold compartments 202 which are spaced along the length of the ship. In order to maintain balance of the ship and to keep it from an unstable condition, the fish are loaded evenly throughout the vessel, generally starting from the end compartments and proceeding toward the mid-portion of the vessel.

Each of the compartments has at its bottom a normally closed discharge opening 206 and a sump compartment 208 having a grate 210 which prevents fish from moving into the sump 208. Each compartment is sealed from the other compartments and is reinforced by a number of truss braces 212 (FIG. 3).

The sump 208 has a sump line 214 which provides for continuous withdrawal of water from the compartment and the removed water can be replaced by fresh sea water. It is advisable to circulate water to some extent through the catch of fish to remove "slime" which accompanies catching of the fish and consists in the main part of fish oil which promotes putrescence of the fish. Circulating fresh water through the catch tends to preserve the fish in a better condition. If for any reason it is not advisable to maintain the fish on board for any length of time it is within the discretion of the operator to freeze the fish by refrigerating the water removed from sump 208. By freezing fish either partially or completely it is possible thereby, to maintain them in an excellent condition on board the ship should docking and unloading be prevented for any length of time. Circulation of the sump water through refrigeration coils is conventional and is not a part of the invention. Conventional refrigeration system arrangements are suitable. Prior to unloading the fish, I have found it advisable to empty all of the sea water out of the compartments and then commence unloading the fish which is also mechanized as will be next described.

Fish unloading

During unloading of the fish the discharge opening 206 which is normally covered by plate 230 is actuated by a power cylinder 232 (FIG. 13). Plate 230 is then moved by a piston rod 234 out of sliding sealing engagement with bull nose plate 236 (FIG. 15) on the runner support beams 238 allowing the fish to drop within a concave conveyor belt 240 which is supported on rollers 242. There are two series of belts 244 and 246 (FIG. 1) which move in the direction of the arrows to midship position (FIG. 1) to deliver the fish from the hold to a series of bucket conveyors 247 which move upwardly through openings 248 at the port and starboard sides of the ship and deliver the fish to a dock facility which can take the form of a cargo net, tank, or other expedient for delivery to the cannery. The fish at the time of delivery are either frozen or unfrozen depending on how long they have been stored. At the time the cover plate 230 is retracted, substantially all of the water has been removed through the sump and the order of unloading the compartments takes place in such a manner that the vessel remains balanced. In other words, first one compartment hold and then the other is unloaded either partially or entirely by operation of the air cylinder 232 associated with the particular compartment hold.

*Operation*

In operation, each of the fishing brackets 44 is pivoted on hinge connection 46 to bring them into fishing position. Likewise, the poles 50 are positioned with their ends extending over the side of the ship to be in substantially horizontal position and the end 186 of the power cylinder 80 is positioned with one of the openings thereof attached to line 126 and a companion opening attached to line 158, to control the angularity of the pole and also control the trajectory of the fish as they are caught.

Figure 12:
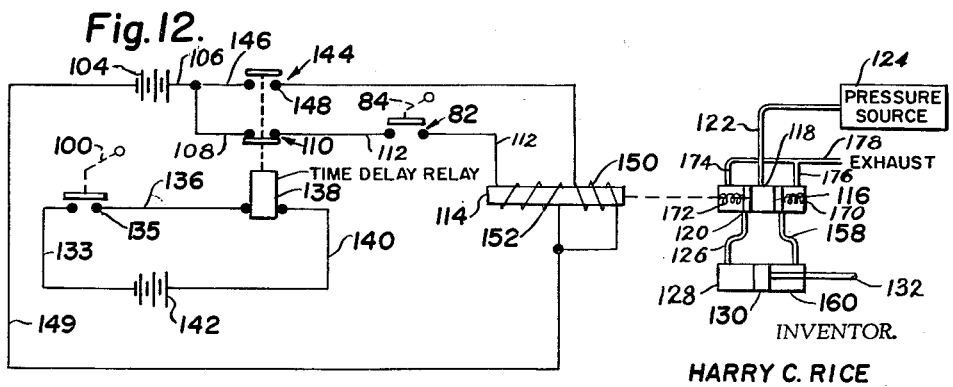
FIG. 12 is a schematic view of the pneumatic and electrical system for operating the fish-catching apparatus illustrated in FIGS. 5–11.

When the vessel has sighted a school of tuna the chumming (fishing) tanks 26 are operated to provide a steady flow of fish bait overboard to maintain the attention of the school of fish. Whenever any fish strikes at hook 56 the tension produced on line 52 will actuate switch 82 thereby energizing power cylinder 80 causing the pole to be moved angularly, swinging the fish in an inboard direction so that it will land either on deck section 192 or strike against slack net 36. Closing of switch 82 completes an electrical circuit energizing solenoid 114 to effect movement of spool valve 116 to communicate pressure to piston 130 moving it toward the right and effecting fish-landing movement of the pole. The trajectory of the fish follows a curved path and during a portion of the trajectory the tension on line 52 is relieved and ordinarily the smooth hook disengages from the fish before it actually lands on deck or strikes the net 36. The relieved tension on the line 52 will then permit a recast of the pole once the pole reaches a position wherein it contacts switch 100 causing the spool valve 116 to communicate pressure source 124 to chamber 160 moving piston 130 in a retractable direction and thereby pivoting the pole in an outboard direction unless the fish has not disengaged from the line in which case the pole will oscillate until the fish is shaken from the line. The oscillation is produced by a combination of reoperation of switch 82 and reoperation of switch 100, the switch 110 preventing simultaneous operation of switches 82 and 100 (FIG. 12). The operation of switch 82 followed by switch 100 communicates the pressure source first to one side and then the other of piston 130, this having the effect of rocking the pole back and forth.

Once the fish strikes the net 36 or lands in deck vicinity 190 it is dropped through opening 193 to one or the other of conveyors 194, 196 and is then transported to conveyor 200 which is operable to convey fish either fore or aft and the entire conveyor is movable as a whole fore and aft so that an operator can control delivery of the fish to one or the other of the compartments 202 thereby filling them in order and to an extent maintaining a balanced condition of the vessel. There are number of fishing devices lining the decks and all of them can operate simultaneously or individually depending upon a signal from the pilot house 22.

Fish are caught at a very quick rate, the total cycle for a 150°, 28 inch fulcrum and 54 inch stroke unit being about .05 minute. In other words, the unit can complete 20 complete fishing cycles per minute per unit and since I have proposed approximately 30 units, 15 at each side of the ship, it is possible to produce for each fishing hour in tons, using a 50% efficiency, the following catch for the following average weight fish:

| Average Weight Fish, lbs. | Pounds Per Hour | Tons Per Hour Using 50% Efficiency Cycle |
| --- | --- | --- |
| 3  | 81,000 | 20.5 |
| 4  | 108,000 | 27.0 |
| 5  | 135,000 | 33.7 |
| 6  | 162,000 | 40.5 |
| 7  | 189,000 | 47.2 |
| 8  | 216,000 | 54.0 |
| 9  | 248,400 | 62.1 |
| 10 | 270,000 | 67.5 |
| 12 | 324,000 | 81.0 |
| 14 | 378,000 | 94.5 |
| 16 | 432,000 | 108.0 |
| 18 | 486,000 | 121.0 |
| 20 | 540,000 | 135.0 |
| 25 | 675,000 | 168.7 |
| 30 | 810,000 | 202.5 |
| 35 | 945,000 | 236.2 |
| 40 | 1,080,000 | 270.0 |
| 45 | 1,215,000 | 303.7 |
| 50 | 1,350,000 | 337.5 |
| 60 | 1,620,000 | 405.0 |
| 70 | 1,890,000 | 472.5 |
| 80 | 2,160,000 | 540.0 |
| 90 | 2,430,000 | 607.5 |

I generally employ air pressure in the cylinders of about 100 pounds per square inch and an 8 inch diameter piston and unit. The fishing pole extends about 13 feet from the fulcrum pivot and is constructed of a strength sufficient to land up to about 750 pounds of catch.

Each unit requires about 60.5 cubic feet of air per minute or 1,815 cubic feet total at 100 pounds per square inch. Since the air cylinders, even with the cushioned terminal stroke, impose considerable inertia force on the poles, I found that it is advisable to provide some flexibility in the pole both so that the fish can shake off and also sustain deceleration and acceleration forces by the air cylinder.

After the vessel is fully loaded and the vessel returns to port, the fish are unloaded at the dock by actuating one of the cylinders 233 associated with a particular hold compartment and discharging fish to the belts 242 which convey the fish from a particular hold and in a particular quantity, calculated to maintain the vessel in balance. Lift mechanisms 246, 248 at the port and starboard side of the vessel receive the fish from belts 242 and then discharge the catch into cargo nets, tanks, conveyors of one type or another and then delivered to the cannery.

The vessel can then be readied to return to sea.

Although the described invention is illustrated in connection with a selected example embodiment, it will be understood that this is exemplary of the invention and is in no sense restrictive thereof. It is reasonable to be expected that those skilled in the art can make numerous revisions and adaptations of the invention to meet individual design requirements and it is intended that such revisions and adaptations as incorporate the herein disclosed principles will be included within the scope of the following claims as equivalents of the invention.

I claim as my invention:

1. An automatic fishing apparatus comprising a fishing pole, a power cylinder actuator having a pressure responsive movable wall therein and a force transmitting connection with said pole to effect angular movement thereof in one or the other of opposite directions, a fluid pressure source for displacing said movable wall, and control means for said actuator including a first switch responsive to fish strike and operative to communicate pressure to one side of said movable wall effecting angular movement of said pole in a fish landing direction, a second switch operatively engaged by said pole when it is moved to an inboard position for landing said fish to communicate pressure to the opposite side of said movable wall and thereby effecting angular movement of said pole from a fish landing position outwardly to a fishing position when the fish is detached.

2. A fishing vessel having automatic fish-catching equipment, including a plurality of automatically-operated fish-catching elements disposed along the length of the ship's deck and extending overboard to be in fish catching position, a slack rope net extending substantially midway of the deck and along the length thereof to break the momentum of the fish as they are caught and direct them into a prescribed area, and inwardly inclined deck sections for receiving said fish and directing them downwardly into the hold of the ship.

3. In an automatic fishing apparatus, having a tubular member with a guide opening at one end thereof, means for journaling said pole for pivotal movement within a vertical plane to effect landing effort on the fish, and a fishing line strung through said pole and guided through said guide opening and movable responsively to a fish strike, the structure comprising a combination switch and switch-actuating arm operatively secured to said fishing line to be operated by a fishing strike, fluid-operated power means including a fluid pressure responsive movable wall operatively connected to said pole to effect its angular movement when operated by said switch means from the tension of said line, a second switch located for operative engagement by said pole when it is moved angularly through a sufficient distance to effect landing of the fish and having operative control with said actuating means to effect reverse angular movement of said pole, and means combined with said first switch responsive to the tension of said line, to prevent full reverse movement of said pole until tension is relieved on said line.

References Cited by the Examiner
UNITED STATES PATENTS

| | | | |
|---|---|---|---|
| 975,750 | 11/10 | Clarke | 214—15 |
| 1,531,440 | 3/25 | Hoyt | 214—15 |
| 2,084,562 | 6/37 | Schafer | 91—355 |
| 2,377,693 | 6/45 | Johnston | 114—.5 |
| 2,413,918 | 1/47 | Harris | 114—.5 |
| 2,523,592 | 9/50 | Powell | 43—15 |
| 2,536,576 | 1/51 | Silva | 43—15 |
| 2,548,038 | 4/51 | Moliskey | 214—15 |
| 2,578,887 | 12/51 | Jackson | 43—15 |
| 2,643,477 | 6/53 | Silva | 43—6.5 |
| 2,843,962 | 7/58 | Porter | 43—15 |
| 3,009,586 | 11/61 | Isbrandtsen | 214—15 |

ABRAHAM G. STONE, Primary Examiner.

MILTON BUCHLER, F. RAY CHAPPELL, Examiners.